United States Patent [19]

Tairaka et al.

[11] Patent Number: 5,091,438
[45] Date of Patent: Feb. 25, 1992

[54] METHOD OF PRODUCING RIGID URETHANE FOAM

[75] Inventors: Yoshihiko Tairaka, Sakai; Masayoshi Idomoto, Minoo, both of Japan

[73] Assignee: Takeda Chemical Industries, Ltd., Osaka, Japan

[21] Appl. No.: 550,367

[22] Filed: Jul. 10, 1990

[30] Foreign Application Priority Data

Jul. 14, 1989 [JP] Japan .................. 1-182996

[51] Int. Cl.$^5$ .................................. C08G 18/14
[52] U.S. Cl. .................................. 521/175
[58] Field of Search .................................. 521/175

[56] References Cited

U.S. PATENT DOCUMENTS

| | | | |
|---|---|---|---|
| 4,105,599 | 8/1978 | Naka et al. | 521/131 |
| 4,487,854 | 12/1984 | Hartman | 521/175 |
| 4,943,597 | 7/1990 | Grunbauer et al. | 521/175 |

FOREIGN PATENT DOCUMENTS 53-9797  4/1978 Japan.
57-22329 5/1982 Japan.

*Primary Examiner*—Maurice J. Welsh
*Attorney, Agent, or Firm*—Wenderoth, Lind & Ponack

[57] ABSTRACT

A method of producing a rigid urethane foam, which comprises reacting a blend polyol consisting of a polyol having a hydroxyl value of 300 to 450 mg KOH/g as prepared by using an acyclic sugar alcohol of 5 to 6 carbon atoms as an initiator and one or more other polyols, said blend polyol having a sugar alcohol content of 3 to 14 weight % and an average hydroxyl value of 300 to 430 mg KOH/g, with a polyisocyanate using 4.0 to 7.0 weight parts of water based on 100 weight parts of said polyol composition as a blowing agent, can reduce the CFC requirements by 50 to 100 percent as compared with the known production technology for rigid urethane foams and, moreover, the adhesive property of the resulting foam is not inferior to that of the conventional urethane foam.

7 Claims, 1 Drawing Sheet

METHOD OF PRODUCING RIGID URETHANE FOAM

FIELD OF THE INVENTION

The present invention relates to a method of producing a rigid urethane foam and more particularly to a method of producing a urethane foam which comprises using a specific blend polyol and, as a principal blowing agent, water.

BACKGROUND OF THE INVENTION

Rigid urethane foam is an industrial material having excellent heat-insulating property, moldablility and field processability and, as such, has been used in a broad spectrum of applications such as the heat insulation of electric refrigerators, buildings, cold storage warehouses, storage tanks, refrigerator ships and pipeline systems.

A typical rigid urethane foam is manufactured by mixing and reacting a first component A the principal ingredients of which are a polyol, a catalyst, a foam stabilizer and a blowing agent and a second component B the principal ingredient of which is a polyisocyanate.

The blowing agent generally used in the manufacture of urethane foams is trichloromonofluoromethane (hereinafter referred to as CFC-11).

However, chlorofluorocarbon (hereinafter referred to as CFC), of which CFC-11 is a species, is chemically so stable that it diffuses into the stratosphere where it destroys the ozone layer. As a result, the ultraviolet rays from the sun are not absorbed into the ozonosphere but reach the surface of the earth to increase the risk of skin cancer, for instance, thus causing serious environmental problems in recent years. Therefore, regulatory control is coming into effect in 1989 over the use of CFC. CFC-11, used in the manufacture of urethane foam, is also subject to the same control.

Under the circumstances, many explorations are in progress for finding blowing agents which may take the place of CFC but up to this day no other useful blowing agent has been developed as yet. HCFC-123 (2,2-dichloro-1,1,1-trifluoroethane), HCFC-141b (1,1-dichloro-1-fluoroethane) and so on have been proposed as substitutes for CFC-11 but none have been implemented on a commercial scale and, hence, we have had no industrially effective method of reducing the CFC requirements.

Barring its adverse effects on the environment, CFC-11 is a very useful material offering the advantages of (1) adequate boiling point, (2) low thermal conductivity in gaseous state, (3) adequate solubility and, hence, viscosity-reducing property, and (4) noncombustibility and low toxicity.

It is a great headache to the industry that it is now obliged to spare the use of this useful substance, CFC, and in the absence of a substitute blowing agent on the market, the only alternative means available is the utilization of water as a blowing agent. While the quantity of water used generally ranges from about 0.2 to 3.0 weight parts as pointed out in Japanese Patent Publication 53-9797/1978, the use of water in greater amounts would cause the following troubles.

(1) Compared with the urethane foam rich in CFC-11, the proportion of $CO_2$ in the gaseous phase of the product urethane foam is larger, with the consequent deterioration of heat-insulating property.

(2) Generally, the product urethane foam becomes friable.

(3) As the proportion of CFC-11 is decreased, the viscosity of the system is increased so that the system becomes incompatible with the foaming machine.

(4) The adhesive property of the urethane foam for the mating surface, particularly the initial adhesive strength, is seriously affected. This decrease in initial adhesive strength increases the incidence of detachment of the foam from the refrigerator or other insulation panel surface. This is a fatal drawback for any urethane foam, of which self-adhesion ought to be one of its basic requirements.

(5) Because of the vigorous exothermic reaction between water and a polyisocyanate, foaming occurs with increased intensity so that the cell walls are destroyed by internal gas pressure to create local open cells. This would result in enhanced thermal conductivity and/or increased water absorption.

SUMMARY OF THE INVENTION

The inventors of the present invention conducted an extensive research for meeting the above-mentioned demand of the society for economizing CFC without sacrificing the unique characteristics of rigid urethane foams and found that the use of a specific blend polyol as a starting material enabled them to manufacture a rigid urethane foam having a good adhesive property with the use of a large proportion of water and realizing a drastic reduction of the CFC requirements.

The present invention relates, therefore, to a method of producing a rigid urethane foam, which comprises reacting a blend polyol consisting of a polyol having a hydroxyl value of 300 to 450 mg KOH/g as prepared by using an acyclic sugar alcohol of 5 to 6 carbon atoms as an initiator and one or more other polyols, said blend polyol having a sugar alcohol content of 3 to 14 weight % and an average hydroxyl value of 300 to 430 mg KOH/g, with a polyisocyanate using 4.0 to 7.0 weight parts of water based on 100 weight parts of said polyol composition as a blowing agent.

DETAILED DESCRIPTION OF THE INVENTION

Figure 1:
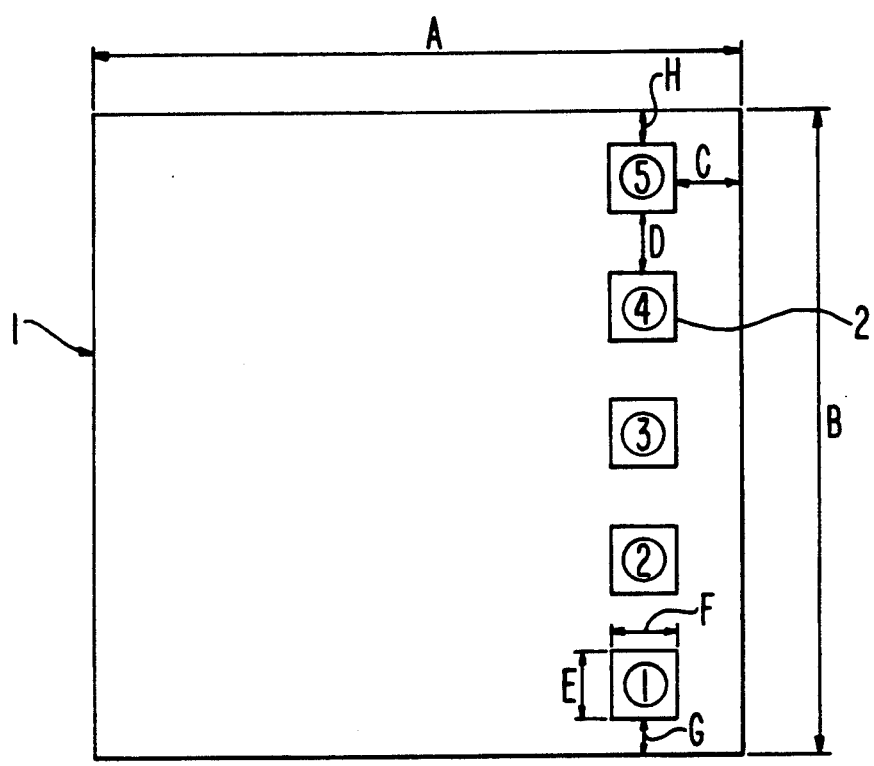
FIG. 1 is a schematic view showing iron sheets (2) arranged on the foam (1)-contacting surface for testing the adhesive property of the foam.

The polyol as prepared by using an acyclic sugar alcohol of 5 to 6 carbon atoms as an initiator, which is employed in the present invention, is a polyol obtainable by subjecting said sugar alcohol and an alkylene oxide, such as ethylene oxide (hereinafter referred to sometimes as EO), propylene oxide (hereinafter referred to sometimes as PO), etc., to addition reaction in the presence of a catalyst.

Examples of said sugar alcohol is hexitol such as sorbitol, mannitol, etc. and pentitol such as arabinitol, ribitol and so on. Particularly preferred is hexitol such as sorbitol. The polyol may be produced by using an active hydrogen compound, such as glycerin, in combination with such sugar alcohol. In any event, the resulting polyol should have a hydroxyl value in the range of 300 to 450 mg KOH/g. If the hydroxyl value is less than 300 mg KOH/g, the dimensional stability of the foam is sacrificed. Therefore, the polyol cannot be used in a sufficiently large amount and, hence, the expected improvement of adhesive property is compromised.

On the other hand, if the hydroxyl value exceeds 450 mg KOH/g, the resulting foam becomes friable and the viscosity of the polyol itself becomes too high to be practically useful.

The proportion of this polyol in the total blend polyol is 3 to 14 weight percent in terms of sugar alcohol content. If the proportion is less than the above range, the improvement of adhesive property is compromised, while any higher proportion in excess of the above range would cause an excessive increase in the viscosity of the polyol.

The other polyol mentioned hereinbefore may be any known polyol.

However, it is necessary that the hydroxyl value of the blend polyol containing such other polyol be within the range of 300 to 430 mg KOH/g. If the hydroxyl value is less than 300 mg KOH/g, the dimensional stability of the foam is compromised. Conversely if the hydroxyl value exceeds 430 mg KOH/g, no adequate improvement is realized in the adhesive property of the foam.

A preferred example of said other polyol is a polyol prepared by using tolylenediamine as an initiator.

With regard to the polyol prepared by using tolylenediamine as an initiator, the polyol having a hydroxyl value of 330 to 460 mg KOH/g is particularly suitable and the proportion of this polyol should be not more than 8 weight % of the total polyol component as a tolylene-diamine content.

The viscosity of the other polyol is not more than 3,000 cps at 25° C. and preferably not more than 2,000 cps at the same temperature.

In the present invention, the blend polyol described above is reacted with a polyisocyanate in the presence of water to give a rigid urethane foam.

The quantity of water to be used is 4.0 to 7.0 weight parts based on 100 weight parts of the total blend polyol. If the proportion of water is less than 4.0 weight parts, the CFC-conserving effect is not sufficient and the low-temperature dimensional stability of the product foam, particularly that at $-30°$ C., is sacrificed. The use of more than 7.0 weight parts of water is futile, for the resulting increase in foam density will not be commensurate with the increased use of water. It is also possible to use some other known blowing agent or agents, such as CFC-11, HCFC-123, HCFC-141b, etc. in a proportion not greater than 25 weight parts, in addition to water.

The polyisocyanate to be employed in he present invention may be any of crude MDI, crude TDI and a TDI-prepolymer or any mixture thereof.

If such a mixture is employed, the proportion of crude MDI, for instance, is preferably not less than 70 weight %.

The proportion of the polyisocyanate may be roughly the same as that in the conventional rigid urethane foam. Thus, the NCO/OH ratio may be about 0.9 to 1.2.

In the production of the rigid urethane foam of the invention, a foam stabilizer and a catalyst, for instance, may also be employed. As the foam stabilizer, any of the known commercial stabilizers for rigid foams can be employed. Thus, for example, B-8404, B-8407, B-8425 (Goldschmidt), F-305, F-345, F-373 (Shin-Etsu Chemical), SH-193 (Toray Silicone) and L-5420, L-5430, L-5350 (Nippon Unicar) may be mentioned. No trouble will be encountered in the manufacture of the urethane foam even if a more active silicone compound for general flexible foams (e.g. B-8017) is used in addition to those silicones for rigid foams. The proportion of the foam stabilizer may be that used generally. Thus, the foam stabilizer is used in a proportion of 0.5 to 5.0 weight parts based on 100 weight parts of the total blend polyol.

With regard to the catalyst, any of the known amine catalysts can be employed. According to the intended uses, various other additives may also be incorporated. Among such additives are flame retardants, antioxidants, colorants, thinners (e.g. propylene carbonate) and so on.

The resulting rigid urethane foam has a density of about 20 to 50 kg/m$^3$.

In accordance with the present invention, the CFC requirements can be reduced by 50 to 100 percent as compared with the known production technology for rigid urethane foam and, moreover, the adhesive property of the resulting foam is not inferior to that of the conventional urethane foam.

EXAMPLES

The following examples, reference examples, and comparative examples are further illustrative of the invention. In the examples, all parts and percents are by weight.

Reference Example 1

A reactor (70 l) equipped with heater and stirrer means was charged with 8.1 kg of sorbitol and 55.4 kg of glycerin, followed by addition of 175 g of KOH flakes. The charge was melted at a temperature of 100° to 110° C. Then, at this temperature, 56.3 kg of PO was added and reacted. After 2 hours of ripening, the residual small amount of unreacted PO was stripped off and the KOH was neutralized with 175 g of aqueous oxalic acid. The resulting potassium oxalate was filtered off and the filtrate was dehydrated. Then, 500 ppm of 2,6-ditertiary-butyl-4-methylphenol (hereinafter referred to as BHT) was added as an antioxidant.

The resulting polyether polyol had a hydroxyl value of 354 mg KOH/g and a viscosity of 1,500 cps (at 25° C.). Its sorbitol content was 11.6%. This polyol is designated as SO-1.

Reference Examples 2 to 7

Using the same reactor as used in Reference Example 1, reference polyols 2 to 7 were prepared by varying the initiator, the amount of PO added and other parameters.

The initiators used, the amounts of PO added and the results of analysis are summarized in Table 1.

TABLE 1

| Reference Example | Initiators and amounts (kg) | | Amount of PO (kg) | Hydroxyl value (mg KOH/g) | Viscosity (cps, 25° C.) | Sorbitol content (%) | Product code |
| --- | --- | --- | --- | --- | --- | --- | --- |
| 1 | Sorbitol | 8.1 | 56.3 | 354 | 1,500 | 11.6 | SO-1 |

TABLE 1-continued

| Reference Example | Initiators and amounts (kg) | | Amount of PO (kg) | Hydroxyl value (mg KOH/g) | Viscosity (cps, 25° C.) | Sorbitol content (%) | Product code |
| --- | --- | --- | --- | --- | --- | --- | --- |
| 2 | Glycerin | 5.4 | 45.0 | 421 | 3,100 | 13.8 | SO-2 |
|   | Sorbitol | 8.1 |  |  |  |  |  |
| 3 | Glycerin | 5.4 | 34.2 | 550 | 2,700 | 12.2 | SO-3 |
|   | Sorbitol | 6.0 |  |  |  |  |  |
| 4 | Glycerin | 9.0 | 54.2 | 375 | 980 | — | MG-1 |
|   | Methyl glycoside | 8.0 |  |  |  |  |  |
| 5 | Glycerin | 4.0 | 52.9 | 380 | 5,300 | — | SU-1 |
|   | Granulated sugar | 4.2 |  |  |  |  |  |
| 6 | Glycerin | 13.5 | 46.3 | 256 | 1,300 | —. | SU-2 |
|   | Granulated sugar | 7.0 |  |  |  |  |  |
| 7 | Glycerin | 3.0 | 50.0 | 399 | 600 | — | SU-3 |
|   | Granulated sugar | 10.0 |  |  |  |  |  |
|   | Propylene glycol | 10.0 |  |  |  |  |  |

Reference Example 8

The same reactor as used in Reference Example 1 was charged with 12 kg of 2.4, 2.6-tolylenediamine (hereinafter referred to sometimes as TDA), 175 g of KOH flakes and 2.0 kg of diethanolamine. Then, at 110° to 120° C., 57.0 kg of propylene oxide was added and reacted. The reaction mixture was neutralized with aqueous oxalic acid and dehydrated, and the resulting crystals were filtered. To the polyol thus obtained was added 500 ppm of BHT. This polyol is designated as TD-1.

The polyol had a hydroxyl value of 358 mg KOH/g and a viscosity of 8,000 cps (at 25° C.). Its TDA content was 16.8%.

Reference Examples 9 to 11

In accordance with the same procedure as above, reference polyols were prepared.

The compositions and analyses of these polyols are presented in Table 2.

stirred with a turbine mixer (1,600 rpm) for 5 to 7 seconds and cast in a predetermined quantity into a mold (for a rectangular panel measuring 500 mm×500 mm×30 mm; made of aluminum) maintained at 40° to 42° C., which was then covered. After 6-minutes curing in an oven at 50° C., the product was released from the mold and its physical properties were determined.

The reactivity and foam density were also investigated by casting the system into an open box. The results are set forth in Table 4.

The aluminum surface of the mold which would contact the foam was covered with polypropylene film for ease of release. In addition, 50 mm×50 mm iron sheets (No. 1 to 5) each having a 3 mm hole drilled in the center were stuck to the foam-contacting surface of the mold with double-coated adhesive tapes as illustrated in FIG. 1. As the foam contacted the mold surface, the foam adhered to the iron sheets. The adhesive strength between the foam and the iron sheet was measured to evaluate the adhesive strength of the foam.

The initial adhesive strength between the foam and

TABLE 2

| Reference Example | Initiators and amounts (kg) | | Amount of PO (kg) | Amount of EO (kg) | Hydroxyl value (mg KOH/g) | Viscosity (cps, 25° C.) | TDA/OTD content (%) | Product code |
| --- | --- | --- | --- | --- | --- | --- | --- | --- |
| 8 | TDA[1] | 12 | 57.0 | — | 358 | 8,000 | 16.8 | TD-1 |
|   | Diethanolamine | 2 |  |  |  |  |  |  |
| 9 | OTD[2] | 12 | 34.2 | 8.7 | 460 | 5,500 | 20.1 | TD-2 |
|   | Diethanolamine | 4.4 |  |  |  |  |  |  |
| 10 | TDA | 12.3 | 28.6 | 12.2 | 470 | 15,000 | 22.2 | TD-3 |
|    | Diethanolamine | 2.2 |  |  |  |  |  |  |
| 11 | Monoethanolamine | 13.4 | 60.8 | — | 500 | 400 | — | ME-1 |

[1]TDA ... 2.4,2.6-tolylenediamine
[2]OTD ... 2.3,3.4-tolylenediamine

Example 1

Using the blend polyol A-1 indicated in Table 3 according to the formulas shown in Table 4, panel foaming was performed by the hand mixing method.

Figure 2:
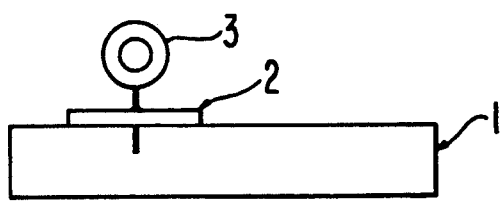
FIG. 2 is a schematic view showing a metal (3) screwed into the center of the iron sheet (2) on the foam (1).

Thus, 100 to 150 g of the polyol was premixed with the foam stabilizer, catalyst and blowing agent in the proportions indicated in Table 4 and the solution temperature was adjusted to 20°±1° C. Then, the required amount of polyisocyanate maintained at 20°±1° C. was added to the polyol premix and the mixture was quickly iron sheet was measured as follows. Thus, after the foam was cured for 6 minutes after casting, the panel foam was released from the mold and a metal was screwed into the center hole of the iron sheet as illustrated in FIG. 2. After 4 minutes (10 minutes after casting), the metal was pulled up from the metal beneath the panel with a push-pull scale (50 kg max.; Imada Seisakusho) and the maximum pulling force was recorded.

It is generally considered that an adhesive strength of not less than 30 kg/25 cm$^2$ is satisfactory.

TABLE 3

| | Blend polyol | | | | | | | | | |
|---|---|---|---|---|---|---|---|---|---|---|
| | A-1 | A-2 | A-3 | A-4 | A-5 | B-1 | B-2 | B-3 | B-4 | B-5 |
| Composition | | | | | | | | | | |
| SO-1 | 60 | 40 | 70 | 50 | 50 | | | | | 60 |
| SO-2 | 20 | | | | | | | | 40 | |
| SO-3 | | | | 20 | | 70 | | | | |
| MG-1 | | | | | | | | 50 | | |
| SU-1 | | | | | | | 40 | | | |
| SU-2 | 20 | 10 | | 10 | | | 20 | 10 | | |
| SU-3 | | 10 | | | | | 10 | | | |
| TD-1 | | 40 | | 20 | | | 30 | 20 | | |
| TD-2 | | | 30 | | | | | | | |
| TD-3 | | | | | 25 | | | | 60 | |
| ME-1 | | | | | | | | 20 | | |
| 32-160*[1] | | | | | 25 | | | | | 40 |
| G-530*[2] | | | | | | 30 | | | | |
| Hydroxyl value (mg KOH/g) | 348 | 350 | 387 | 390 | 332 | 544 | 358 | 387 | 450 | 278 |
| Viscosity (cps, 25° C.) | 1600 | 2500 | 2200 | 2400 | 1300 | 1800 | 6900 | 1300 | 8000 | 720 |
| Sorbitol content (%) | 9.7 | 4.6 | 8.1 | 8.2 | 5.8 | 8.5 | — | — | 5.5 | 7.0 |
| TDA/OTD content (%) | — | 6.7 | 6.0 | 3.4 | 5.0 | — | 5.0 | 3.4 | 13.3 | — |

*[1]Actcol 32-160 ... Takeda Chemical Industries, Ltd., glycerin-PO adduct, OH value; 160 mg KOH/g, viscosity; 240 cps
*[2]Actcol G-530 ... Takeda Chemical Industries, Ltd., glycerin-PO adduct, OH value; 530 mg KOH/g, viscosity; 640 cps

TABLE 4-(1)

| | Example | | | | | |
|---|---|---|---|---|---|---|
| Polyol component | 1<br>A-1 | 2<br>A-2 | 3<br>A-3 | 4<br>A-4 | 5<br>A-5 | 6<br>A-5 |
| (formula) (parts) | | | | | | |
| Polyol | 100 | 100 | 100 | 100 | 100 | 100 |
| Silicone foam stabilizer*[a] | 1.5 | 1.5 | 1.5 | 1.5 | 1.5 | 1.5 |
| Water | 4.5 | 4.5 | 4.5 | 4.5 | 5.5 | 4.5 |
| Catalyst*[b] | 1.3 | 1.2 | 1.3 | 1.5 | 1.0 | 1.2 |
| CFC-11 | 14 | 14 | 14 | 15 | — | 13 |
| Lupranate M-20S*[c] | 167 | 167 | 177 | 177 | 179 | |
| Lupranate M-70L*[d] | | | | | | 162 |
| Free blow comparison <Reactivity> | | | | | | |
| cream time (sec) | 23 | 19 | 22 | 22 | 24 | 23 |
| Gel time (sec) | 82 | 80 | 84 | 85 | 82 | 84 |
| Foam density (kg/cm$^3$) | 24.7 | 24.9 | 25.2 | 24.6 | 26.8 | 24.8 |
| CFC-11 in formula (%) | 4.9 | 4.9 | 4.7 | 5.0 | 0 | 4.5 |
| Reduction of CFC requirements (%)*[e] | 66 | 66 | 65 | 63 | 100 | 67 |
| <Physical properties of panel foam> | | | | | | |
| D over: overall density (kg/cm$^3$) | 32.5 | 33.7 | 33.7 | 34.0 | 35.3 | 33.8 |
| D over/D free | 1.32 | 1.35 | 1.34 | 1.38 | 1.32 | 1.37 |
| 10% compressive strength (kg/cm$^2$)*[f] | 0.97 | 1.15 | 1.20 | 1.20 | 1.12 | 1.20 |
| Initial adhesive strength (kg/25 cm$^2$) | | | | | | |
| Iron sheet No. (5) | 45 | 50 ↑ | 49 | 45 | 38 | 42 |
| Iron sheet No. (4) | 50 | 50 ↑ | 46 | 45 | 40 | 45 |
| Iron sheet No. (3) | 50 ↑ | 50 | 50 | 50 | 42 | 45 |
| Iron sheet No. (2) | 50 ↑ | 50 ↑ | 50 | 50 | 47 | 50 ↑ |
| Iron sheet No. (1) | 38 | 50 | 41 | 48 | 47 | 45 |
| Mean value | 45 | 50 | 47 | 48 | 43 | 45 |
| Dimensional change (%)*[f] | | | | | | |
| −30° × 22 hr | Good | Good | Good | Good | Good | Good |
| 80° × 22 hr*[g] | −1.6 | −0.1 | −0.2 | +0.1 | −1.2 | −0.4 |

↑: Scale over, foam destroyed
*[a]: Shin-Etu Chemical, F-345
*[b]: Tosoh, Toyocat MR
*[c]: BASF, crude MDI
*[d]: BASF, polyfunctional crude MDI
*[e]: Compared with CFC-11 of Comparative Example 6
*[f]: Maximum value in thickness direction
*[h]: Maximum absolute value in thickness direction Examples 2 to 6 and Comparative Examples 1 to 9

In the same manner as Example 1, panel foams were prepared using the polyols indicated in Table 3 in accordance with the formulas shown in Table 4 and their physical properties were compared.

It will be apparent from Table 4 that the urethane foams according to Examples 1 to 6 of the invention exhibited excellent adhesive properties and satisfactory dimensional stability.

Even when a polyol contains sorbitol, it does not exhibit a satisfactory adhesive property if its hydroxyl value is high as in Comparative Example 4 or its average hydroxyl value is high as in Comparative Example 4. The polyol of Comparative Example 5, which has a low hydroxyl value, is unsatisfactory in dimensional stability and very poor in compressive strength.

Furthermore, polyols free of sorbitol, such as the polyols of Comparative Examples 2 and 3, also fail to exhibit a satisfactory adhesive property.

It goes without saying that the ordinary commercial polyols exhibit poor adhesive property in such water-rich systems (Refer to Comparative Examples 7 and 8).

Comparative Example 6 is an example of the usual urethane foam system employing CFC-11. It should also be noticed that even the blend polyol is proper as in the polyol of Comparative Example 9, the foam is poor in low-temperature dimensional stability and the reduction of CFC requirements is unsatisfactory. (Note) Dimensional changes in excess of 2% are macroscopically visible. The dimensional change should not be more than 2%.

TABLE 4-(2)

| Polyol component | Comparative Example | | | | | | | | |
|---|---|---|---|---|---|---|---|---|---|
| | 1 B-1 | 2 B-2 | 3 B-3 | 4 B-4 GR-44*h | 5 B-5 GR-44 | 6 Actcol GR-62*i | 7 Actcol | 8 Actcol | 9 A-5 |
| (formula) (parts) | | | | | | | | | |
| Polyol | 100 | 100 | 100 | 100 | 100 | 100 | 100 | 100 | 100 |
| Silicone foam stabilizer*a | 1.5 | 1.5 | 1.5 | 1.5 | 1.5 | 1.5 | 1.5 | 1.5 | 1.5 |
| Water | 4.5 | 4.5 | 4.5 | 4.5 | 4.5 | 1.8 | 4.5 | 4.5 | 2.7 |
| Catalyst *b | 2.0 | 1.3 | 1.0 | 1.2 | 1.6 | 1.5 | 1.2 | 1.2 | 1.8 |
| CFC-11 | 18 | 14 | 14 | 16 | 12 | 40 | 16 | 20 | 30 |
| Lupranate M-20S*c | 208 | 168 | 174 | 186 | 148 | 151 | 186 | 185 | 133 |
| Free blow comparison | | | | | | | | | |
| <Reactivity> | | | | | | | | | |
| Cream time (sec) | 24 | 19 | 19 | 21 | 22 | 17 | 22 | 22 | 18 |
| Gel time (sec) | 80 | 87 | 83 | 84 | 85 | 82 | 85 | 89 | 84 |
| Foam density (kg/cm$^3$) | 24.8 | 24.8 | 24.6 | 24.8 | 24.9 | 24.5 | 24.9 | 23.9 | 24.9 |
| CFC in formula (%) | 5.4 | 4.8 | 4.7 | 5.2 | 4.5 | 13.5 | 5.2 | 6.4 | 11.1 |
| Reduction of CFC requirements (%)*e | 60 | 64 | 65 | 61 | 67 | 0 | 61 | 53 | 18 |
| <Physical properties of panel foam> | | | | | | | | | |
| D over: overall density (kg/cm$^3$) | 33.3 | 34.0 | 33.1 | 34.4 | 33.2 | 34.0 | 33.8 | 32.4 | 32.8 |
| D over:/D free | 1.34 | 1.37 | 1.34 | 1.39 | 1.33 | 1.39 | 1.36 | 1.36 | 1.32 |
| 10% compressive strength (kg/cm$^2$)*f | 1.04 | 1.21 | 1.00 | 1.10 | 0.78 | 1.20 | 1.08 | 0.90 | 0.80 |
| Initial adhesive strength (kg/25 cm$^2$) | | | | | | | | | |
| Iron sheet No. (5) | 3 | 19 | 32 | 13 | 50 | 50 | 3 | 21 | 49 |
| Iron sheet No. (4) | 0 | 14 | 11 | 8 | 48 | 50 ↑ | 5 | 14 | 50 ↑ |
| Iron sheet No. (3) | 0 | 8 | 4 | 7 | 50 ↑ | 50 ↑ | 5 | 8 | 50 ↑ |
| Iron sheet No. (2) | 0 | 8 | 8 | 5 | 50 ↑ | 50 ↑ | 3 | 15 | 49 |
| Iron sheet No. (1) | 0 | 6 | 6 | 6 | 47 | 38 | 0 | 19 | 50 |
| Mean value | 0 | 11 | 12 | 8 | 49 | 48 | 3 | 15 | 50 |
| Dimensional change (%)*f | | | | | | | | | |
| −30° × 22 hr | Good | Good | Good | Good | −2.2 | Good | Good | Good | Poor |
| 80° × 22 hr*g | +0.4 | −0.7 | +0.8 | +0.3 | −3.5 Poor | +0.2 | −0.4 | −0.7 | +3.5 Poor |

*h: Takeda Chemical Industries, Ltd.
Sucrose-aromatic amine polyol
Hydroxyl value = 455 mg KOH/g
Viscosity = 5,500 cps (at 25° C.)
*i: Takeda Chemical Industries, Ltd.
Methyl glucoside-aromatic amine polyol
Hydroxyl value = 415 mg KOH/g
Viscosity = 4,100 cps (at 25° C.)

tion reaction in the presence of a catalyst and (2) a polyol obtained by subjecting an alkylene oxide and tolylenediamine to addition reaction in the presence of a catalyst and having a hydroxyl value of 330 to 460 mg KOH/g, said blend polyol having an acyclic sugar alcohol content of 3 to 14 weight %, a tolylenediamine content of not more than 8 weight % and an average hydroxyl value of 300 to 430 mg KOH/g, with a polyisocyanate using 4.0 to 7.0 weight parts of water based on 100 weight parts of said polyol as a blowing agent.

2. A method of producing a rigid urethane foam as claimed in claim 1, wherein the acyclic sugar alcohol of 5 to 6 carbon atoms is sorbitol.

3. A method of producing a rigid urethane foam as claimed in claim 1, wherein the viscosity of the polyol (2) is not more than 3,000 cps at 25° C.

4. A method of producing a rigid urethane foam as claimed in claim 1, wherein the viscosity of the polyol (2) is not more than 2,000 cps at 25° C.

5. A method of producing a rigid urethane foam as claimed in claim 1, wherein the polyisocyanate is a mixture of crude MDI and other polyisocyanate(s), whose crude MDI content is not less than 70 weight %.

6. A method of producing a rigid urethane foam as claimed in claim 1, wherein the NCO/OH ratio is about 0.9 to 1.2.

7. A rigid urethane foam prepared in accordance with the process of claim 1.

What is claimed is:

1. A method of producing a rigid urethane foam, which comprises reacting a blend polyol consisting of (1) a polyol having a hydroxyl value of 300 to 400 mg KOH/g obtained by subjecting an alkylene oxide and an acyclic sugar alcohol of 5 to 6 carbon atoms to addi-

* * * * *

UNITED STATES PATENT AND TRADEMARK OFFICE
CERTIFICATE OF CORRECTION

PATENT NO. : 5,091,438
DATED : February 25, 1992
INVENTOR(S) : YOSHIHIKO TAIRAKA and MASAYOSHI IDOMOTO It is certified that error appears in the above-identified patent and that said Letters Patent is hereby corrected as shown below:

Col. 9, line 67, delete "400" and insert therefor --450--.

Signed and Sealed this

Fifteenth Day of June, 1993

Attest:

MICHAEL K. KIRK

Attesting Officer

Acting Commissioner of Patents and Trademarks